Feb. 6, 1968  R. L. SCOTT  3,367,089
APPARATUS FOR DEHYDRATING A PLURALITY OF GAS STREAMS
Filed April 4, 1966  3 Sheets-Sheet 1

INVENTOR.
RICHARD L. SCOTT
BY *Head & Johnson*
ATTORNEYS

Feb. 6, 1968    R. L. SCOTT    3,367,089
APPARATUS FOR DEHYDRATING A PLURALITY OF GAS STREAMS
Filed April 4, 1966    3 Sheets-Sheet 2

INVENTOR.
RICHARD L. SCOTT
BY *Heal & Johnson*
ATTORNEYS

INVENTOR.
RICHARD L. SCOTT

BY *Head & Johnson*

ATTORNEY

United States Patent Office 3,367,089
Patented Feb. 6, 1968

3,367,089
APPARATUS FOR DEHYDRATING A PLURALITY
OF GAS STREAMS
Richard L. Scott, Tulsa, Okla., assignor to
Forrest L. Murdock, Tulsa, Okla.
Filed Apr. 4, 1966, Ser. No. 539,912
3 Claims. (Cl. 55—208)

ABSTRACT OF THE DISCLOSURE

The apparatus described by this invention comprise dehydrating a plurality of wet gas streams each having a separate pressure and volume wherein a first wet gas stream flows through a first dehydrating zone where it is contacted by a stream of dry glycol to remove moisture from the gas stream with the stream of glycol leaving the first dehydrating zone as a stream of wet glycol, a second wet gas stream made to flow through a second dehydrating zone where it contacts a second stream of dry glycol and a second stream of dry glycol leaves the second absorbing zone as a second wet stream of glycol, the first and second gas streams continuing out of their dehydrating zones independently and then being combined to form a single wet stream and this combined wet glycol stream being dried in a single distillation zone from which dry glycol may be withdrawn and recycled to the said wet gas streams in accordance with demand requirements of the wet gas streams. The individual wet gas streams to be treated may originate from separate sources, such as separate producing wells or separate zones within the same producing well, and may enter the treating zones at different pressures and/or with different moisture content.

---

This invention relates to an apparatus for treating gas streams. More particularly, the invention relates to an apparatus for dehydrating gas streams in which a spent dehydrating fluid is regenerated. Still more particularly, the invention relates to an apparatus wherein two or more gas streams are independently dehydrated by a dehydrating fluid which may be regenerated in a single regeneration step.

It is well known in the oil and gas industry that moisture may be removed from a gas stream by flowing the gas stream through a zone in which the stream contacts a stream of substantially anhydrous glycol. Without wishing to be restricted to specific glycols, by way of example, some useful glycols are ethylene glycol, diethylene glycol and triethylene glycol. In these processes the glycol absorbs the water with which it is miscible and is usually regenerated in another step of the process by heating the wet glycol above the boiling point of water, 212° F., and below the boiling point of dry glycol. Then the dried or regenerated glycol is recycled in the stream to the zone of desiccation where it contacts and removes moisture from additional wet gas. Thus, the conventional gas dehydration system consists of a dehydration zone where the wet gas is brought into contact with the dehydrating fluid and a regeneration zone where the wet dehydrating fluid is regenerated. Water which was removed from the wet gas in the dehydration zone is driven out of the system in the regeneration zone by the application of heat to the wet dehydrating fluid. Thus, a single wet gas stream is treated in a single dehydrating zone by a single stream of dehydrating fluid and the resulting wet dehydrating fluid is regenerated in a single regeneration zone.

An object of this invention is to provide an apparatus for dehydrating a gas stream. Another object is to provide an apparatus for dehydrating a plurality of gas streams in a plurality of dehydration zones wherein the dehydrating fluid is regenerated in a common regeneration zone.

Still another object of this invention is to provide an apparatus for the dehydration of and removal of condensible hydrocarbons from a plurality of gas streams in a plurality of treating zones wherein the dehydration is accomplished with a plurality of glycol streams and wherein the moisture laden glycol streams are regenerated in one regeneration zone.

Still another object of this invention is to provide an apparatus for the dehydration of a plurality of gas streams with an integral fluid dehydration system wherein the gas streams may be delivered at different pressures to a dehydration zone and treated individually.

Still another object of this invention is to provide an apparatus for the dehydration of a plurality of gas streams wherein the gas streams originate in different zones of the same producing well and are separately treated by the same dehydration system.

Still another object of the invention is to provide an apparatus for the dehydration of a plurality of gas streams by a single interconnected dehydration system wherein the gas streams originate from separate sources.

Another object of this invention is to provide an apparatus for the dehydration of a gas stream wherein a plurality of wet dehydration fluid streams are gathered in a single regeneration zone.

Further objects and advantages of the invention will become apparent from the accompanying description and claims and from the drawings wherein:

FIGURE 1 is a schematic diagram of one form of the apparatus of this invention. Although FIGURE 1 describes two wet gas streams being separately treated in a parallel arrangement with two absorption units, it should be understood that this is not to be taken as a limitation upon the number of gas streams and absorption units which may be employed in carrying out the process of this invention.

Figure 1:
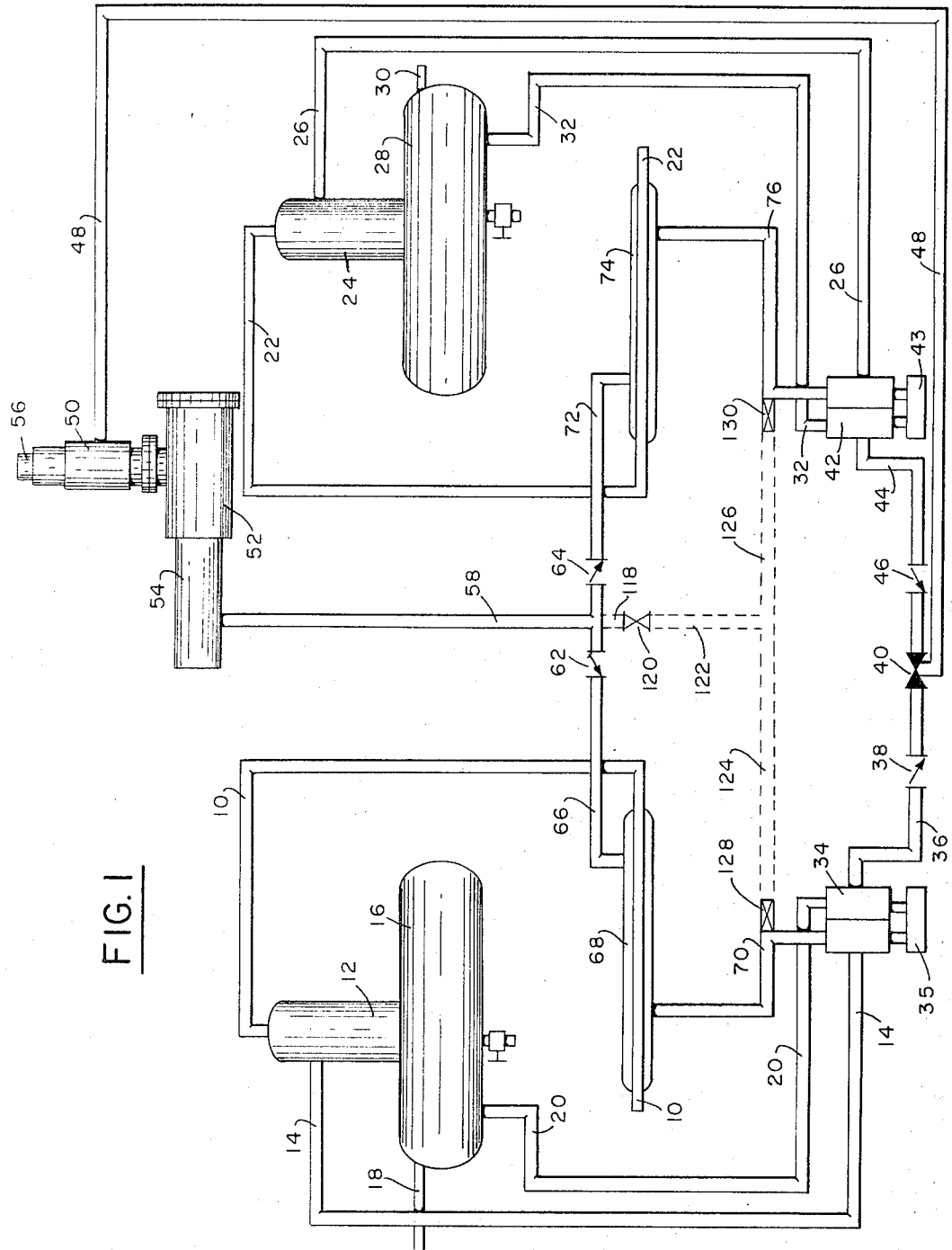
FIGURE 1 is a schematic diagram of a process carried out as described by this invention.

A first wet gas stream passes through line 10 and enters absorber 12 where it is mixed with dry glycol. Dry glycol enters absorber 12 through a first dry glycol line 14 from a previous recirculation zone. In absorber 12 the first wet gas stream and the dry glycol stream are intimately mixed and pass together into a first glycol gas separator 16 which contains a conventional packed bed of absorbent material. The mixture of gas, glycol and moisture passes through the packed bed where glycol collects on the absorbent material and the gas stream passes out through the line 18 as a first dry gas stream where it may be passed to storage or to sales. The glycol stream which initially entered the dehydrating zone as a stream of dry glycol then passes from separator 16 through line 20 as a first wet stream of glycol and is passed through a regenerating and recirculating zone to be hereinafter described.

In like manner, a second wet gas stream enters line 22 and passes into an absorber 24 similar in operation to absorber 12 where the wet gas stream is thoroughly mixed with an incoming stream of dry glycol which enters absorber 24 through line 26. The operation of the second dehydrating zone is similar to that of the first zone described above in that the wet gas and dry glycol are thoroughly mixed in absorber 24 and passed into a second glycol gas separator 28 which also contains conventional packing material upon which the glycol collects as wet glycol and through which the gas stream passes as dry gas. This dry gas passes from the separator through line 30 and again goes either to sales or storage. The glycol which collects on the absorbent material falls to the bottom and collects upon the bottom of the separating unit and passes from the separator 28 through line 32 as a stream of wet glycol and through line 32 enters into a regeneration and recirculation zone. Wet glycol from line 20 enters pump 34 which is driven by motor 35 and is discharged from pump 34 through line 36 and check valve 38 to three-way valve 40 where it combines with the second wet gas stream of glycol from separator 28 which has passed through line 32, pump 42 driven by motor 43, line 44 and check valve 46. The combined wet glycol stream then leaves three-way valve 40 through line 48 and flows through line 48 to a distillation zone which includes still 50, reboiler 52 and accumulator 54.

The wet glycol stream entering pumps 34 and 42 are at a pressure and flow rate determined independently by pumps 34 and 42, which rates may be determined manually or automatically and will be substantially the same as the flow rates and pressures of the respective dry glycol streams passing through the lines 14 and 26 respectively. As the wet glycol stream leaves pump 34 through line 36, it passes through check valve 38 which is positioned at that point to enable the wet glycol stream to combine with a second or subsequent wet glycol stream and to prevent back-flow of wet glycol through line 36 and pump 34 when the second or subsequent wet glycol stream is at a different pressure then that existent in line 36. Likewise, wet glycol passing through line 32 into pump 42 flows at a rate and pressure determined by pump 42 which can be adjusted either manually or automatically as needed. Again, in pump 42 the dry glycol stream passing through the system will be at substantially the same flow rate and pressure. Line 44 connects with check valve 46 to prevent back-flow of glycol from any other wet glycol stream where there is a pressure differential.

Three-way valve 40 may be a manifold system to which a plurality of wet glycol lines are connected when the dehydration process of this invention incorporates more than two separate gas streams and consequently more than two separate dehydration zones. But, for the sake of simplicity, where the valve 40 is a three-way valve connecting two separate wet glycol lines, the combined glycol stream flowing from valve 40 is pressurized to the extent that pumps 34 and 42 pressurize lines 36 and 44.

In still 50 the wet glycol stream entering through line 48, which at that point is relatively cool, encounters hot glycol vapor and steam passing upward into still 50 from reboiler 52. The relatively cool wet glycol stream removes glycol vapor from the steam and permits the steam to be emitted through outlets 56. The condensed glycol vapor then passes with the wet glycol stream into reboiler 52 which is maintained at a temperature of at least 300° F., a temperature which is high enough to drive off water vapor but still below the boiling point of glycol. Thus, dry glycol passes from the reboiler 52 into accumulator 54. From accumulator 54 a dry or demoisturized glycol stream flows through line 58 to a T junction which, in the case of more than two parallel absorption systems, may be a manifold arrangement, and the dry glycol stream then branches off through check valves 62 and 64 by means of which it is distributed through the individual parallel absorption systems. For instance, from check valve 62 the dry glycol stream flows through line 66 and an external heat exchanger 68 in which it is in heat exchange relationship with the incoming gas stream, which gas stream is generally much cooler than the dry glycol stream and assists in additional cooling of the dry glycol stream. From heat exchanger 68 the dry glycol stream flows through line 70 to pump 34 from which it emerges into line 14 to begin the cycle again. Another branch of the dry glycol stream flowing through line 58 similarly passes through check valve 64, through line 72, into heat exchanger 74 which brings this second dry glycol stream into heat exchanger 74 in which it is in heat exchange relationship with the second wet gas stream which will give additional cooling to the relatively warm dry glycol stream. From heat exchanger 74 the dry glycol stream passes through line 76 into pump 42 from which the dry glycol stream is recirculated into line 26 to begin another cycle.

Preferably pump 34 and pump 42 are designed to pump multiple lines but, if desired, any first and second circulating means may be substituted for pumps 34 and 42 by which the wet glycol streams and dry glycol streams are circulated through their separate absorption systems.

Figure 2:
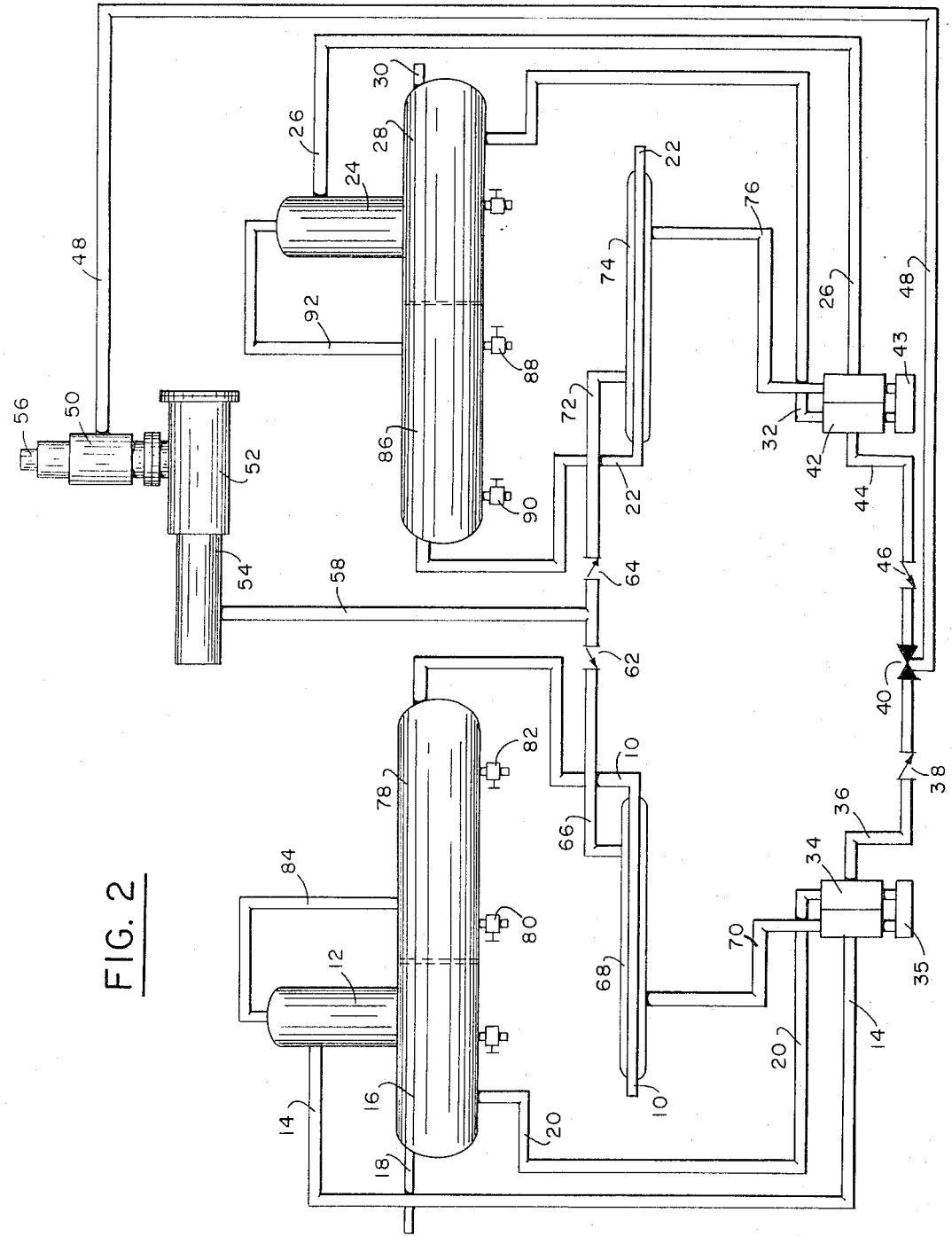
FIGURE 2 is a schematic diagram of a process as carried out by another embodiment of this invention which includes a scrubbing step before the dehydration of the gas stream.

As indicated above, the first wet gas stream and second wet gas stream may originate from either separate producing wells or from separate producing zones within a single producing well. In either of these situations it is likely that the individual wet gas streams will be produced at different pressures and will most likely be produced also with different inherent moisture contents. Therefore, each of the individual wet gas streams to be treated in accordance with this invention will require its own particular rate of flow of dry glycol in order to achieve the most efficient dehydration of that wet gas stream. Thus, the demand requirements of each individual wet gas stream for its own dry glycol stream requires its own circulating means which is independently variable from any other dry glycol circulating means within the process for the withdrawal of dry glycol from the distillation and regeneration zone. In FIGURE 2 is shown a modification of the process of this invention in which each wet gas stream passes through a scrubbing zone where free liquids are removed from the wet gas stream before the wet gas stream enters the dehydrating zones. The free liquids which are removed in the scrubbing zone are water condensate and hydrocarbon condensate.

In FIGURE 2 the scrubbing zone is positioned adjacent each separating unit 16 and the first wet gas stream entering through line 10 enters a first scrubber 78 where condensed moisture may be carried out of the system through a water drain 80 and condensed hydrocarbons may be carried out through a distillate drain 82. Then from the scrubber the wet gas passes through line 84 and into absorber 12 as in FIGURE 1. Similarly, the second wet gas stream entering the system through line 22 enters a second scrubber 86 and is subjected to the same treatment wherein condensed water may be drawn off through drain 88 and condensed hydrocarbons may be drawn off through drain 90. From second scrubber 86 the wet gas stream passes through line 92 into absorber 24 and is further treated as in the process described in FIGURE 1.

Figure 3:
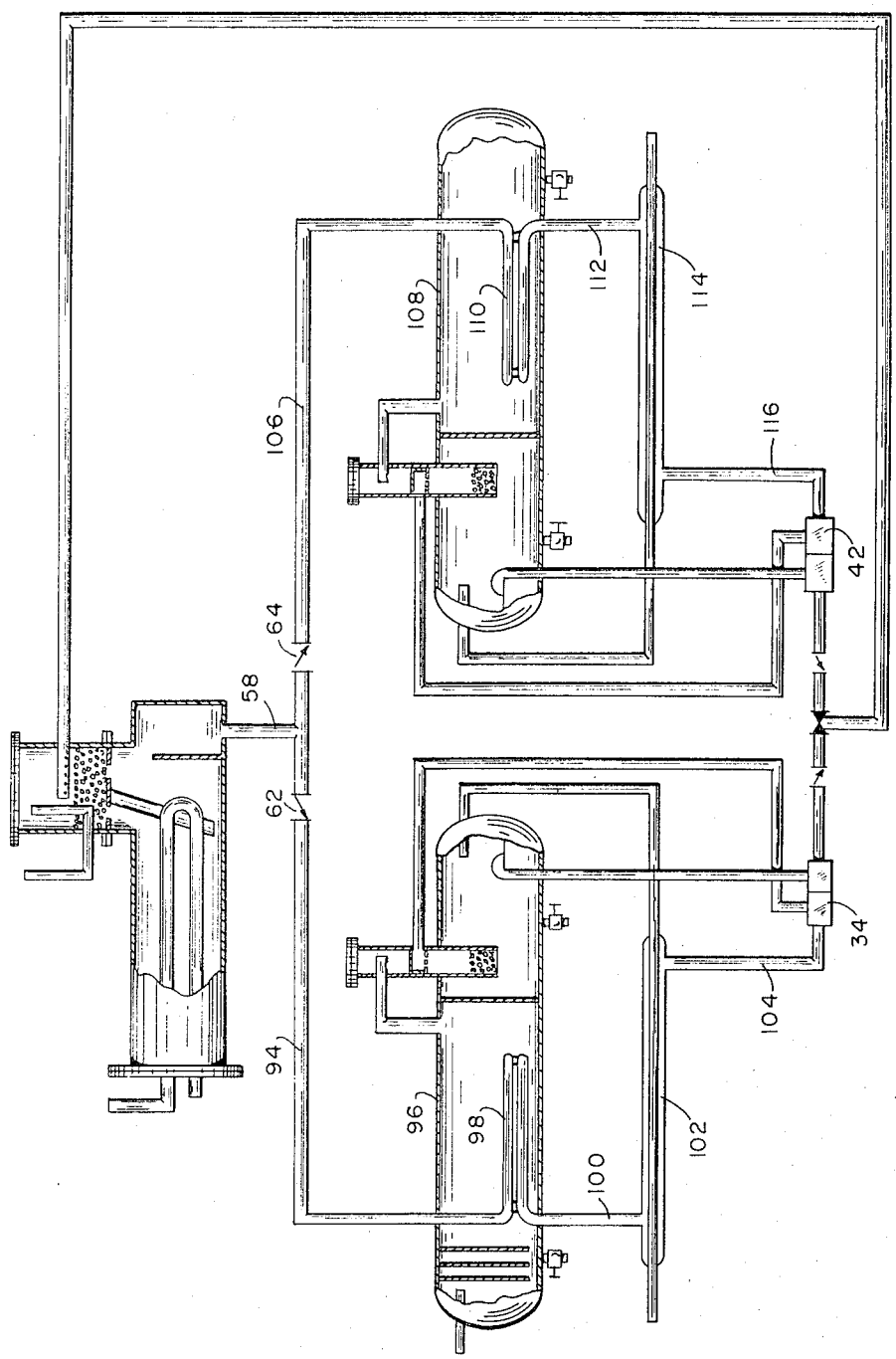
FIGURE 3 is a fragmentary schematic view of a process carried out according to this invention in which a glycol stream is in heat exchange relationship with a wet gas stream in a scrubbing step of this process.

In FIGURE 3 is shown a modification of a portion of the process of the invention in which the dry glycol streams returning from the accumulator to the recirculating means are initially cooled by being in heat exchange relationship with both the wet gas stream and the dry gas stream. In this modification a first dry glycol stream passing from check valve 62 enters line 94 which brings the dry glycol stream into a modified scrubber 96, a first modified scrubber in which the first dry glycol stream is in heat exchange relation with the wet gas stream by reason of the dry glycol stream passing through scrubber 96 in line 98. The partically cooled dry glycol stream leaves scrubber 96 through line 100 by means of which it is carried into an external heat exchanger in which it is in heat exchange relationship with the dry gas stream. Line 100 leads to an external heat exchanging coil 102 in which it is additionally cooled and from which it leaves through line 104 to return to pump 34 and to be recycled. Similarly, a second dry glycol stream leaves check valve 64 through line 106 which passes through a second modified scrubber 108 in which the second dry glycol stream is initially cooled. In scrubber 108 the second glycol stream passes through line 110 and leaves scrubber 108 through line 112 to enter an external heat exchanger through external heat exchanging coil 114 where it is in heat exchange relationship with the second dry gas stream and from which heat exchanging coil it leaves by way of line 116 to return to pump 42 to be further recirculated. As with the forms of this invention shown in FIGURES 1 and 2, the modification of FIGURE 3 is not limited to the treatment of only two wet gas streams but may be applied to the treatment of a plurality of gas streams and each gas stream may have a distinct origin, as with those of FIGURES 1 and 2, and may originate with a distinct pressure and moisture content so that the dry glycol stream may be circulated through the parallel systems in response to the demand requirements of the individual gas streams.

In FIGURE 1 is also shown an optional by-pass system in the dry glycol line. In this by-pass system a side stream of hot dry glycol may be withdrawn from line 58 through line 118, valve 120, line 122, lines 124 and/or 126, valves 120 or 130, to be mixed with cooler dry glycol passing through lines 70 or 76. In this manner the temperature of the glycol streams entering pumps 34 and 42 may be additionally controlled. Valves 120, 128 and 130 may be either manually operated or automatically controlled by temperature sensitive means employed in lines 58, 70 and 76.

Since many different embodiments of this invention may be made without departing from the spirit and scope of this disclosure, it is to be understood that the specific embodiments described in detail herein are not to be taken in a limiting sense, since the scope of the invention is best defined by the appended claims.

What is claimed:

1. A unitary apparatus for dehydrating a plurality of separate wet gas streams each having a separate pressure and flow rate comprising:

a separate glycol dehydration contact chamber for each of said wet gas streams, each of said chambers having a gas inlet, a gas outlet, a dry glycol inlet and a wet glycol outlet;

a unitary glycol distillation chamber having a wet glycol inlet and a dry glycol outlet;

a wet glycol pressure imparting pump for each of said dehydration contact chambers, each of said wet glycol pumps having an inlet and an outlet;

a check valve in series with each of said wet glycol pump permitting flow only in one direction through each of said pump;

a conduit connecting the wet glycol outlets of each of said dehydration contact chambers to the said inlet of a separate said wet glycol pressure imparting pump;

a dry glycol pressure imparting pump for each of said dehydration contact chambers, each of said dry glycol pumps having an inlet and an outlet;

a check valve in series with each of said dry glycol pumps permitting flow of dry glycol in only one direction through each of said pumps;

a conduit connecting said dry glycol inlet of said distillation chamber to each of said dry glycol pressure imparting pump inputs;

a conduit connecting the outlet of each of said wet glycol pumps to said wet glycol inlet of said glycol distillation chamber; and a conduit connecting each of said dry glycol pumps to said dry glycol outlet of said glycol distillation chamber.

2. A unitary apparatus for dehydrating a plurality of separate wet gas streams as described in claim 1 including a separate scrubber in series with said wet gas inlets of each of said separate glycol dehydration chambers.

3. A unitary apparatus for dehydrating a plurality of separate wet gas streams as described in claim 1 including a heat exchanger having one chamber in series with said dehydration chamber gas inlet and another chamber in series with said wet glycol outlet of each of said dehydration contact chambers.

References Cited

UNITED STATES PATENTS

| | | | |
|---|---|---|---|
| 2,690,814 | 10/1954 | Reid | 55—32 |
| 2,990,691 | 7/1961 | Glasgow | 55—175 |
| 3,001,604 | 9/1961 | Worley | 55—171 |
| 3,094,574 | 6/1963 | Glasgow et al. | 55—31 |
| 3,132,987 | 5/1964 | Sinex | 55—31 |

REUBEN FRIEDMAN, *Primary Examiner.*

C. N. HART, *Assistant Examiner.*